United States Patent
Schultze et al.

(10) Patent No.: US 11,258,637 B2
(45) Date of Patent: Feb. 22, 2022

(54) METHOD FOR OPERATING TSN-ENABLED NETWORK COUPLING ELEMENTS

(71) Applicant: Robert Bosch GmbH, Stuttgart (DE)

(72) Inventors: Stephan Schultze, Lohr-Wombach (DE); Andreas Selig, Lohr am Main (DE); Johannes Von Hoyningen-Huene, Kiel (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 16/849,208

(22) Filed: Apr. 15, 2020

(65) Prior Publication Data

US 2020/0336338 A1     Oct. 22, 2020

(30) Foreign Application Priority Data

Apr. 17, 2019 (DE) .......................... 102019205634.2

(51) Int. Cl.
| | |
|---|---|
| H04L 12/66 | (2006.01) |
| H04L 12/939 | (2013.01) |
| H04L 12/823 | (2013.01) |
| H04L 12/751 | (2013.01) |
| H04L 12/707 | (2013.01) |
| H04L 12/703 | (2013.01) |
| H04L 12/841 | (2013.01) |
| H04L 49/552 | (2022.01) |
| H04L 47/32 | (2022.01) |
| H04L 45/02 | (2022.01) |
| H04L 45/00 | (2022.01) |

(Continued)

(52) U.S. Cl.
CPC ............ *H04L 12/66* (2013.01); *H04L 49/552* (2013.01); *H04L 45/02* (2013.01); *H04L 45/22* (2013.01); *H04L 45/28* (2013.01); *H04L 47/28* (2013.01); *H04L 47/32* (2013.01)

(58) Field of Classification Search
CPC ......... H04L 12/66; H04L 45/02; H04L 45/22; H04L 45/28; H04L 47/28; H04L 47/32; H04L 49/552
See application file for complete search history.

(56) References Cited

U.S. PATENT DOCUMENTS 8,300,563 B2 * 10/2012 Krishnaswamy ..... H04L 1/0003
                                                   370/310
10,574,399 B2 * 2/2020 Koskinen .............. H04L 1/1848
(Continued)

OTHER PUBLICATIONS

IEEE Standard 802.1CB-2017, "IEEE Standard for Local and Metropolitan Area Networks—Frame Replication and Elimination for Reliability", 2017, pp. 1-102.
(Continued)

*Primary Examiner* — Saad A. Waqas
*Assistant Examiner* — Kai Chang
(74) *Attorney, Agent, or Firm* — Norton Rose Fulbright US LLP; Gerard Messina

(57) ABSTRACT

A method for operating a TSN-enabled network coupling element, in particular, a TSN bridge, which is designed to receive redundant data packets. The method includes ascertaining at least one number of expected, non-received data packets via the TSN-enabled network coupling element, and transmitting the ascertained number of expected, non-received data packets from the TSN-enabled network coupling element to a control instance.

23 Claims, 2 Drawing Sheets

(51) Int. Cl.
*H04L 45/28* (2022.01)
*H04L 47/28* (2022.01)

(56) References Cited

U.S. PATENT DOCUMENTS

| | | | |
|---|---|---|---|
| 2004/0103278 A1* | 5/2004 | Abhishek | H04W 12/069 |
| | | | 713/160 |
| 2017/0149639 A1* | 5/2017 | Vasseur | H04L 12/44 |
| 2018/0006955 A1* | 1/2018 | Bush | H04L 41/0896 |
| 2019/0028575 A1* | 1/2019 | Wetterwald | H04L 45/34 |
| 2019/0116000 A1* | 4/2019 | Thubert | H04L 1/0045 |
| 2020/0136894 A1* | 4/2020 | Bush | H04L 1/08 |
| 2020/0162357 A1* | 5/2020 | Zacks | H04L 43/04 |

OTHER PUBLICATIONS

IEEE Std. 802.1Qca-2015 "Standard for Local and Metropolitan Area Networks—Media Access Control (MAC) Bridges and Virtual Bridged Local Area Networks Amendment: Path Control and Reservation", 2015, pp. 1-20.

* cited by examiner

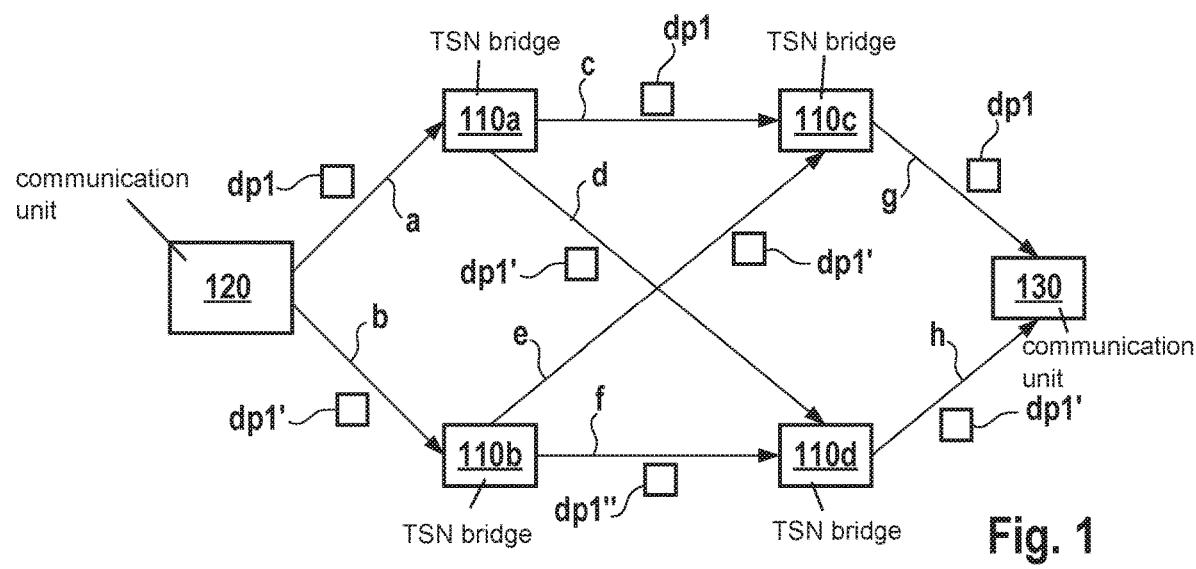
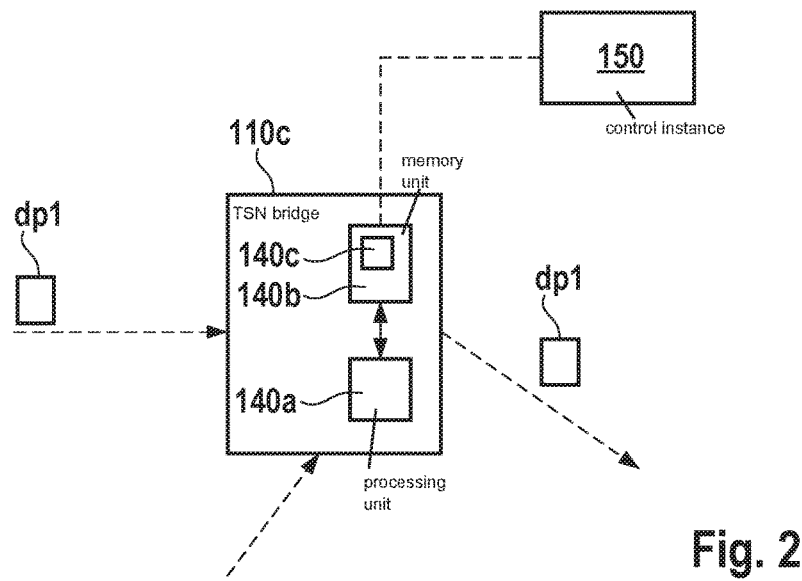

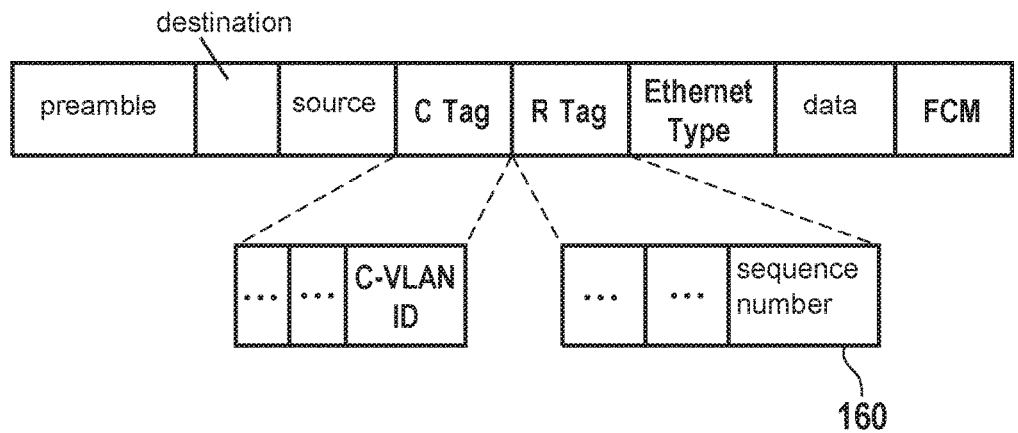
Fig. 3
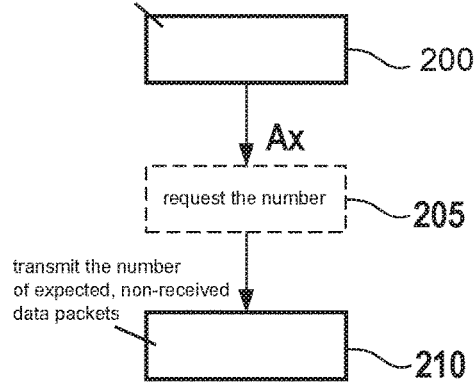
Fig. 4A
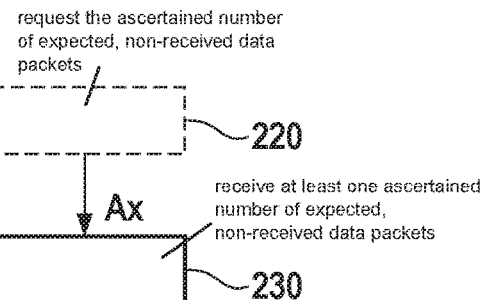
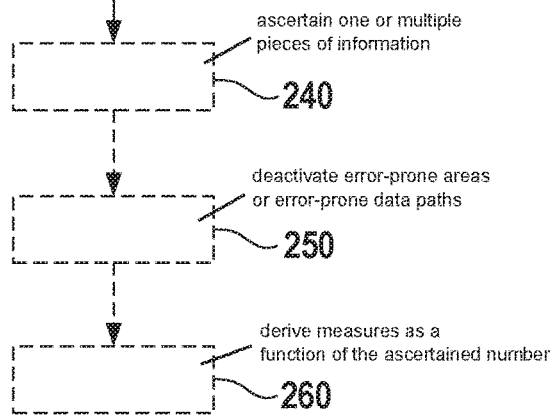
Fig. 4B

METHOD FOR OPERATING TSN-ENABLED NETWORK COUPLING ELEMENTS

CROSS REFERENCE

The present application claims the benefit under 35 U.S.C. § 119 of German Patent Application No. DE 102019205634.2 filed on Apr. 17, 2019, which is expressly incorporated herein by reference in its entirety.

BACKGROUND INFORMATION

The present invention relates to a TSN-enabled network coupling element, in particular, to a TSN bridge, and to a method for operating a TSN-enabled network coupling element, in particular, a TSN bridge, which is designed to receive redundant data packets.

The present invention further relates to a control system and to a method for operating a control instance in a TSN communication system.

SUMMARY

In industrial communication methods, but also in the time-critical networking inside vehicles, a deterministic and low-latency data exchange between individual system components is desirable. Under the term "time sensitive networking" (TSN) extensions of the Ethernet standard are presently in progress, which also result in low-latency and reliable data streams. A time sensitive networking, TSN communication system is a communication system, which is based on the IEEE time sensitive networking (TSN) standard. In such communication systems, there is frequently no direct connection between a data source and a data sink. Instead, the data packets are forwarded between data source and data sink by multiple network coupling elements, for example, TSN bridges.

To increase the probability of a successful data exchange, it is possible to utilize redundant data paths. The TSN Standard IEEE 802.1CB-2017 relates to the structure of redundant networks, in particular, to the structure of redundant data paths, in which data packets are duplicated and later combined again, in order to thus enable a seamless redundancy. In this standard, a data packet is duplicated at a defined point in the network and sent virtually simultaneously over redundant data paths. Only one of the received data packets is preferably forwarded at a later point at which the redundant data paths converge again, and each additional redundantly sent data packet is rejected.

The transmission is considered successful if at least one copy of a data packet reaches the data sink. From the perspective of the time-critical application, it is relevant that at least one copy of the data packet reaches its predetermined destination within a predetermined period of time.

From the perspective of the system design, the troubleshooting and the prediction of future problems, however, it is also desirable to determine how many data packets are lost in transit without this being noticed at the data sinks.

A time sensitive networking, TSN, network coupling element according to further preferred specific embodiments is a network coupling element, which is based on the Ethernet standard and is designed to operate according to the IEEE Standard 802.1CB. One example of a TSN network coupling element according to further preferred specific embodiments is a TSN switch, which is designed to operate according to the IEEE Standard 802.1CB, in particular, to locally count non-critical packet losses in the TSN switch.

The TSN-enabled network coupling element is advantageously able to consider multiple incoming and outgoing redundant data packets. The first successfully received copy of a data packet in each case is advantageously forwarded, while all following copies are rejected by the TSN-enabled network coupling element.

An example method for operating a TSN-enabled network coupling element, in particular, a TSN bridge, which is designed to receive redundant data packets, includes according to preferred specific embodiments the following steps: ascertaining at least one number of expected, non-received data packets via the TSN-enabled network coupling element and transmitting the ascertained number of expected, non-received data packets from the TSN-enabled network coupling element to a control instance.

An expected, non-received data packet is preferably a data packet, which is expected by the TSN-enabled network coupling element, but which is not received within one communication cycle and/or within a predetermined period of time, in particular, before a predetermined deadline, within one communication cycle.

In further preferred specific embodiments, it is provided that the ascertainment of the number of expected, non-received data packets takes place for one data path respectively.

In further preferred specific embodiments, it is provided that the ascertainment of the number of expected, non-received data packets includes the detection of the non-reception of a respective data packet and the at least temporary storing of the number of the non-received data packets in an internal memory.

In further preferred specific embodiments, it is provided that the data packet includes pieces of information, which allow for a unique assignment to a data stream and to a sequence number within the data stream, and the detection of the non-reception of a respective data packet takes place based on the sequence number of the data packets.

In further preferred specific embodiments, it is provided that the transmission of the ascertained number takes place in response to a request of the control instance.

The transmission of the ascertained number in response to a request of the control instance preferably includes the receiving of a request from the control instance by the TSN-enabled network coupling element.

Further preferred specific embodiments relate to a TSN-enabled network coupling element, in particular, to a TSN bridge, which is designed to carry out the following steps: ascertaining the number of expected, non-received data packets by the TSN-enabled network coupling element and transmitting the ascertained number of expected, non-received data packets from the TSN-enabled network coupling element to a control instance.

In further preferred specific embodiments, it is provided that the TSN-enabled network coupling element is designed to carry out the method according to the specific embodiments.

Further preferred specific embodiments relate to a method for operating a control instance in a TSN communication system, the control instance receiving an ascertained number of expected, non-received data packets from at least one TSN-enabled network coupling element.

In further preferred specific embodiments, it is provided that the control instance requests the ascertained number of expected, non-received data packets from the at least one TSN-enabled network coupling element.

In further preferred specific embodiments, it is provided that the ascertained number is requested in each communication cycle or every N communication cycles where N>1.

In further preferred specific embodiments, it is provided that based on the number, the control instance ascertains one or multiple pieces of information i) through iii):
i) instantaneous communication quality of the TSN communication system;
ii) error-prone areas and/or error-prone data paths of the TSN communication system;
iii) future losses of data packets to be expected.

In further preferred specific embodiments, it is provided that the control instance deactivates error-prone areas and/or error-prone data paths of the TSN communication system.

In further preferred specific embodiments, it is provided that the control instance derives measures as a function of the ascertained number, including one or multiple of the following steps:
a) establishing new transmission paths;
b) preparing an ongoing application of the TSN communication system for critical errors;
c) taking the findings obtained into consideration in future configurations of TSN communication systems.

Further preferred specific embodiments relate to a control instance, which is designed to receive an ascertained number of expected, non-received data packets from at least one TSN-enabled network coupling element.

According to one preferred specific embodiment, the control instance is a central control instance.

In further preferred specific embodiments, it is provided that the control instance is designed to carry out the method according to the specific embodiments.

Further preferred specific embodiments relate to the use of the method according to the specific embodiments and/or of the TSN-enabled network coupling element according to the specific embodiments and/or of the control instance according to the specific embodiments in a motor vehicle and/or in an industrial production facility.

Further preferred specific embodiments relate to a computer-readable (memory) medium, including instructions which, when executed by a computer, prompt the computer to carry out the method.

The method according to the specific embodiments advantageously enables pieces of information about the reliability of a redundant TSN communication network to be obtained and appropriate measures to be derived from the pieces of information. In this way, losses in the data communication may be predicted and thus avoided, if necessary.

The features according to the specific embodiments may be utilized in all areas in which redundant, time-critical communication methods are used and in which at the same time indicators about the reliability to be expected are to be monitored. Such areas are, among others, industrial production, but also networks inside vehicles.

Further features, potential applications and advantages of the present invention result from the following description of exemplary embodiments of the present invention, which are depicted in the figures. All described or depicted features in this case form, alone or in arbitrary combination, the subject matter of the present invention, regardless of their combination, wording, or depiction in the description or in the figures.

BRIEF DESCRIPTION OF THE DRAWINGS

FIG. 1 schematically shows a representation of a redundantly designed communication system according to preferred specific embodiments.

FIG. 2 schematically shows a representation of a control instance according to further preferred specific embodiments.

FIG. 3 shows an exemplary structure of a data packet according to further preferred specific embodiments.

FIG. 4A schematically shows a simplified flow chart of a method according to further preferred specific embodiments.

FIG. 4B schematically shows a simplified flow chart of a method according to further preferred specific embodiments.

DETAILED DESCRIPTION OF EXAMPLE EMBODIMENTS

FIG. 1 schematically shows a representation of a redundantly designed communication system 100 according to preferred specific embodiments. Communication system 100 is a time sensitive networking (TSN) communication system 100, i.e., a communication system, which is based on the IEEE time sensitive networking (TSN) Standard. Communication system 100 is advantageously designed according to the TSN Standard IEEE 802.1CB-2017 and includes at least one TSN-enabled network coupling element based on the Ethernet standard and is designed to operate according to the IEEE 802.1CB-2017, in particular, a TSN bridge, which is designed to receive and advantageously also to forward preferably redundant data packets.

Multiple redundant data paths are configured for the redundant transmission of the data by the communication system. Redundant data paths in this case may, for example, be configured via different network trees with the aid of mechanisms from IEEE 802.1ca (path control and reservation). For this purpose, the number n of the incoming, redundant data streams is configured for each network component.

In the present case, TSN communication system 100 includes four TSN-enabled network coupling elements 110a, 110b, 110c, 110d, in which in each case a TSN bridge is involved, i.e., a TSN-enabled network coupling element that is able to connect multiple network segments and/or terminals or the like to one another. TSN bridges 110a through 110d are designed to forward the received data streams. The TSN bridges may, for example, be designed as so-called infrastructure bridges, frequently also referred to as a switch, which only receive and forward data, or as so-called bridged-end-devices, which appear for particular data streams as a data source, talker or data sink, listener and for other data streams only as a bridge. In the industrial context, these may, for example, be controllers, drives or input/output devices, which are fitted with at least two Ethernet ports. In the specific embodiments depicted in FIGS. 1 and 2, TSN bridges 110a through 110d are designed, for example, as infrastructure bridges.

As shown in FIG. 1, a communication device 120 is provided by way of example in the present case, which represents a data source, also referred to as a talker, in the present example. It involves, for example, an industrial control unit (for example, of the industrial Ethernet type), which transmits data via one or multiple ports to one or multiple terminals, as they are usable, for example, in industrial production facilities. A TSN communication system includes, in general, a multitude of data streams; simplified, only redundant data paths a, b, c, d, e, f, g, h of one data stream are depicted in FIG. 1. Communication unit 120 sends data D1, in particular, in the form of a corresponding data packet dp1 via data path a to TSN bridge 110a and a copy thereof, in particular, in the form of a corresponding data packet dp1' via data path b to TSN bridge 110b. TSN bridge 110a forwards received data packet dp1 in the form of corresponding data packet dp1 via data path c to TSN bridge 110c and a copy thereof, in particular, in the form of a corresponding data packet dp1' via data path d to TSN bridge 110d. TSN bridge 110b also forwards received data packet dp1' in the form of corresponding data packets dp1' and dp1" via data paths e and f to TSN bridges 110c and 110d.

TSN bridge 110c then receives data packets dp1 and dp1' via a first and a second port. The TSN bridges are advantageously designed to forward in each case the first successfully received copy of a data packet, and to reject all following copies. According to the depicted specific embodiment, data packet dp1 is forwarded, for example, via data path g. Accordingly, TSN bridge 110d forwards data packet dp1' via data path h.

A further communication unit 130 is also provided, as apparent from FIG. 1, which is, for example, a terminal, in particular, a data sink, also referred to as a listener such as, for example, an actuator and/or sensor or the like (for example, an industrial Ethernet terminal), at which one or multiple propagation paths of a data stream end. In the industrial context, this could be a drive, for example. In general, the regulation of a drive requires the transmission of setpoint data from the controller to the drive and the transmission of actual data in the opposite direction. The first transmission direction is depicted by way of example in FIG. 1. For the opposite, non-depicted transmission direction, terminal 130 could assume the role of the talker and terminal 120 the role of the listener.

The TSN bridges 110c and 110d in the present case send data packets dp1 to terminal 130.

TSN bridges 110a through 110d may analogously also receive additional data packets dp4 through dpn from additional components (not depicted) and/or send additional data packets dp2 through dpn to additional components (also not depicted). Data packets dp2 through dpn which, for example, contain or correspond to or are derived at least partially from other data packets dp1, dp1' in further preferred specific embodiments, may also be exchanged between TSN switches 110a, 110b or 110c and 110d.

Thus, based on the specific embodiment depicted in FIG. 1, a transmission would be successful if at least one copy of a data packet dp1 of the data transmitted by terminal 120 reaches terminal 130. For the data exchange described, it is relevant from the perspective of the time-critical application whether at least one copy of each data packet reaches its predetermined destination, i.e., terminal 130, within a particular time period within one communication cycle.

Different cycle times and deadlines may result in the process depending on the application; these are advantageously constant during the real time operation. The cycle time describes in which time intervals data packets having the same structure and for the same purpose must be exchanged. The volume of data is preferably constant in each cycle with respect to packet size and to the number of required packets per cycle, which is exchanged between the terminals during the cyclical real time operation.

The deadline describes up to which point in time within one communication cycle the data must have reached their destination, for example, a terminal, without errors. If a terminal does not receive an expected packet or receives it only after the deadline, this is classified as a packet loss. Individual packet losses may be tolerated depending on the application and network protocol considered, whereas other packet losses result, for example, in an emergency stop and an error status of the system. The terminal is able to detect and count the packet losses.

Redundant data packets are advantageously provided with pieces of information, which contain a unique assignment to the data stream and a sequence number 160 within the data stream. One possible structure of the data packets is depicted by way of example in schematic form in FIG. 3. Such a structure is also described in FIG. 8.3 in the IEEE 802.1CB Standard.

Data packets that are redundant relative to one another are provided with the same sequence number 160. For example, data packets dp1 and dp1' transmitted by terminal 120, as well as data packets dp1, dp1' and dp1" forwarded by TSN bridges 110a, 110b include the same sequence numbers 160. In turn, TSN bridges 110c and 110d recognize data packets dp1; dp1'; dp1" redundant relative to one another by sequence numbers 160. The initially received data packet of a sequence number 160 is forwarded, a data packet including sequence number 160 already received is rejected.

At least TSN bridge 110c is advantageously configured with the number n of the incoming redundant data streams. This means, TSN bridge 110c knows the number n of the incoming redundant data streams and thus expects n incoming data packets dp1, dp1', dp1" having the same sequence number 160. Mechanisms for configuring redundant data paths are described, for example, in IEEE 802.1ca (path control and reservation). In the specific embodiments depicted in FIGS. 1 and 2, n=2.

During the data transmission, the following scenarios with respect to TSN bridge 110c may then result:

1. TSN bridge 110c receives all 2 expected data packets dp1, dp1' having the same sequence number 160 via data paths a and c within one communication cycle and before the deadline. Preferably only the first of the two, here dp1, is forwarded via data path g, the other n−1 data packet, here dp1', is rejected. Terminal 130 then receives data packet dp1 via data path g.

2. TSN bridge 110c receives at least one data packet within one communication cycle and before the deadline, but not all expected n data packets having the same sequence number 160 within one communication cycle or at least not before the deadline. TSN bridge 110c receives, for example, data packet dp1 via data path c but not dp1' via data path e. Received data packet dp1 is forwarded. Terminal 130 thus receives data packet dp1 from bridge 110c. The packet loss of data packet dp1' via data path e thus has no impact on the reception of data packet dp1 by terminal 130 and is thus also unable to be detected at terminal 130. Such a packet loss is therefore also referred to as a non-critical packet loss. The data communication between terminal 130 and 130 in this case continues to function undisrupted.

The following scenario not relevant to the present invention is also possible:

3. Bridge 110c receives none of the expected data packets dp1 and dp1' and is thus also unable to forward any data packet. In this case, the bridge itself is unable to detect any packet loss.

In order to determine how many packets are lost in transit without this being noticed at the terminals, TSN bridges 110a through 110d are advantageously designed to ascertain a number of expected, non-received data packets dp1; dp1', dp1". This is explained by way of example below with reference to TSN bridge 110c. TSN bridge 110c advantageously includes at least one processing unit 140a and at least one memory unit 140b assigned to processing unit 140a including instructions, upon the execution of which by the processing unit the method described below and schematically depicted in FIG. 4A is implementable.

In a step 200, TSN bridge 110c ascertains at least one number of expected, non-received data packets (dp1; dp1"). In a second step 210, TSN bridge 110c transmits the ascertained number of expected, non-received data packets dp1; dp1'; dp1" to a control instance 150.

TSN bridge 110c is configured with the number n of the incoming redundant data streams. This means, TSN bridge 110c knows the number n of the incoming redundant data streams and thus expects n incoming data streams. The number of non-received data packets is then the result of the subtraction of the actually received data packets from the number n.

The number of expected, non-received data packets advantageously includes the number of expected non-received data packets for multiple communication cycles. TSN bridge 110c advantageously ascertains the number for a respective data path x, i.e., the TSN bridge ascertains the number for data path c and the number for data path g. In the case of the above described second scenario, the number is thus increased by one, since data packet dp1' has not been received in a timely manner.

Bridge 110c advantageously stores the ascertained number at least temporarily in an internal memory 140c. This memory may, for example, be part of memory unit 140b. TSN bridge 110c advantageously includes an implemented counter for counting the number of expected, but non-received data packets dp1, dp1'. The IEEE 802.1CB Standard describes how counters for counting non-received, redundant packets may be implemented in the TSN bridges, in order to locally detect such initially non-critical packet losses in TSN bridges.

The counter contents of the counters are advantageously initialized with zero or the instantaneous value is ascertained and stored before the start of the real time operation and/or before the start of an application.

TSN bridge 110c transmits 210 the ascertained number to a control instance 150. In this case, it is possible that TSN bridge 110c is designed to transmit by itself the number to the control instance. It is also possible that control instance 150 requests 205 the number from TSN bridge 110c. The transmission of the ascertained number upon a request 205 of control instance 150 includes preferably the reception of a request from the control instance by the TSN bridge. For this purpose, control instance 150 may access internal memory 140c of TSN bridge 110c via a suitable protocol. Potential protocols in this case are, for example, NETCONF or SNMP. Control instance 150 advantageously includes a processing unit and a memory unit, including instructions, upon the execution of which by the processing unit the method described below and schematically depicted in FIG. 4B is implementable.

In a step 230, control instance 150 receives at least one ascertained number of expected, non-received data packets dp1; dp1' from TSN bridge 110c. Control instance advantageously requests 220 the ascertained number of expected, non-received data packets dp1; dp1' from TSN bridge 110c.

The transmission of the number may advantageously take place during real time operation. The transmission may also take place in periodic intervals, for example, every N communication cycles where N>1.

Control instance 150 is advantageously designed to request 220 the number from multiple TSN bridges 110a through 110d of a TSN-enabled communication system 100.

Control instance 150 is advantageously designed, based on the number of expected, non-received data packets dp1, dp1', ... dpn, dpn', to ascertain 240 one or multiple pieces of information i) through iii):

i) instantaneous communication quality of TSN communication system 100;
ii) error-prone areas and/or error-prone data paths a through h of TSN communication system 100;
iii) future losses of data packets dp1, dp1', ... dpn, dpn' to be expected.

An error-prone area and/or an error-prone data path may be determined based on the number ascertained for a respective data path x and/or based on the number ascertained from a respective TSN bridge. An error-prone area of a TSN communication system is understood to mean at least one data path and/or at least one component of the TSN communication system.

Control instance 150 is advantageously designed to deactivate 250 error-prone areas and/or error-prone data paths of TSN communication system 100.

Control instance 150 is advantageously designed to derive 260 measures as a function of the ascertained number, including one or multiple of the following steps:
a) establishing new transmission paths;
b) preparing an ongoing application of TSN communication system 100 for critical errors;
c) taking the findings obtained into consideration in future configurations of TSN communication systems 100.

New transmission paths may be established, in particular, for bridging error-prone transmission paths, in order in this way to improve the transmission quality of TSN-enabled communication systems 100.

The control instance ascertains preferably potential critical errors to be expected on the basis of the ascertained, future losses of data packets dp1, dp1', ... dpn, dpn' to be expected. A critical error may, for example, result in a, in particular, safety critical error in an ongoing application. Precautions, in particular, safety precautions, for example, stopping or pausing the ongoing application, lowering the speed of the moving components, may be taken for preparing an ongoing application of the TSN communication system for critical errors.

The findings obtained may also be taken into consideration in the (new) configuration of the TSN communication system. For example, problematic areas and/or data paths may be deactivated and instead, new data paths may be established.

What is claimed is:

1. A method for operating a TSN-enabled network coupling element, which is configured to receive redundant data packets, the method including the following steps:
   ascertaining at least one number of expected, non-received redundant data packets by the TSN-enabled network coupling element, the ascertained number being at least one count of how many redundant data packets were expected by the TSN-enabled network coupling element but not received by the TSN-enabled network coupling element; and
   transmitting the ascertained number of expected, non-received redundant data packets from the TSN-enabled network coupling element to a control instance, the control instance being separate from the TSN-enabled network coupling element, wherein the redundant data packets have the same sequence number in a respective sequence number field of each of the redundant data packets.

2. The method as recited in claim 1, wherein the TSN-enabled network coupling element is a TSN bridge.

3. The method as recited in claim 1, wherein the ascertainment of the number of expected, non-received redundant data packets takes place for each data path respectively.

4. The method as recited in claim 1, wherein the ascertainment of the number of expected, non-received redundant data packets includes the following steps:
  detecting the non-reception of a respective redundant data packet; and
  at least temporarily storing the number of the non-received data packets in an internal memory.

5. The method as recited in claim 4, wherein the redundant data packets include pieces of information, which enable a unique assignment to a data stream and to a sequence number within the data stream, and the detection of the non-reception of a respective data packet takes place based on the sequence number of the data packets.

6. The method as recited in claim 1, wherein the transmission of the ascertained number takes place in response to a request by the control instance.

7. The method as recited in claim 1, wherein the TSN-enabled network coupling element is configured for a number n of incoming redundant data streams, and wherein the TSN-enabled network coupling element determines the number of expected, non-received redundant data packets by subtracting actually received redundant data packets from the number n.

8. The method as recited in claim 1, wherein the TSN-enabled network coupling element determines the number of expected, non-received redundant data packets using a counter.

9. The method as recited in claim 1, wherein the TSN-enabled network coupling element transmits the ascertained number of expected, non-received redundant data packets to the control instance in periodic intervals.

10. A TSN-enabled network coupling element, configured to receive redundant data packets, TSN-enabled network coupling element configured to:
  ascertain at least one number of expected, non-received redundant data packets by the TSN-enabled network coupling element, the ascertained number being at least one count of how many redundant data packets were expected by the TSN-enabled network coupling element but not received by the TSN-enabled network coupling element; and
  transmit the ascertained number of expected, non-received redundant data packets from the TSN-enabled network coupling element to a control instance, the control instance being separate from the TSN-enabled network coupling element, wherein the redundant data packets have the same sequence number in a respective sequence number field of each of the redundant data packets.

11. The TSN-enabled network coupling element as recited in claim 10, wherein the TSN-enabled network coupling element is a TSN bridge.

12. A method for operating a control instance for a TSN communication system, the method comprising the following step:
  receiving, by the control instance from at least one TSN-enabled network coupling element, at least one ascertained number of expected, non-received redundant data packets, the at least one ascertained number being at least one count of how many redundant data packets were expected by the TSN-enabled network coupling element but not received by the TSN-enabled network coupling element, the control instance being separate from the TSN-enabled network coupling element, wherein the redundant data packets have the same sequence number in a respective sequence number field of each of the redundant data packets.

13. The method as recited in claim 12, further comprising:
  requesting, by the control instance, the at least one ascertained number of expected, non-received data packets, from the at least one TSN-enabled network coupling element.

14. The method as recited in claim 13, wherein the requesting of the at least one ascertained number takes place in each communication cycle of the TSN communication system or in every N communication cycles where N>1.

15. The method as recited in claim 12, wherein, based on the received ascertained number, the control instance ascertains one or multiple pieces of information i) through iii):
  i) instantaneous communication quality of the TSN communication system;
  ii) error-prone areas and/or error-prone data paths of the TSN communication system;
  iii) future losses of data packets to be expected.

16. The method as recited in claim 15, wherein the control instance ascertains the error-prone areas and/or error prone data paths of the TSN communication system, and the method further comprises:
  deactivating, by the control instance, the error-prone areas and/or error-prone data paths of the TSN communication system.

17. The method as recited in claim 12, further comprising:
  deriving measures as a function of the ascertained number, including one or multiple of the following steps:
    a) establishing new transmission paths;
    b) preparing an ongoing application of the TSN communication system for critical errors;
    c) taking findings obtained into consideration in future configurations of TSN communication systems.

18. A control instance for a TSN communication system, the control instanced being configured to:
  receive at least one ascertained number of expected, non-received data packets from at least one TSN-enabled network coupling element, the ascertained number being at least one count of how many redundant data packets were expected by the TSN-enabled network coupling element but not received by the TSN-enabled network coupling element, the control instance being separate from the TSN-enabled network coupling element, wherein the redundant data packets have the same sequence number in a respective sequence number field of each of the redundant data packets.

19. A TSN communication system, comprising:
  at least one TSN-enabled network coupling element configured to receive redundant data packets, TSN-enabled network coupling element configured to ascertain at least one number of expected, non-received redundant data packets by the TSN-enabled network coupling element, the ascertained number being at least one count of how many redundant data packets were expected by the TSN-enabled coupling element but not received by the TSN-enabled network coupling element, and transmit the ascertained number of expected, non-received redundant data packets from the TSN-enabled network coupling element to a control instance; and
  a control instance configured to receive from the at least one TSN-enabled network coupling element the at least one ascertained number of expected, non-received redundant data packets, the control instance being separate from the TSN-enabled network coupling element, wherein the redundant data packets have the same sequence number in a respective sequence number field of each of the redundant data packets.

20. The TSN communication system as recited in claim 19, wherein the TSN-enabled network coupling element is a TSN bridge.

21. The TSN communication system as recited in claim 19, wherein TSN communication system is in a motor vehicle and/or in an industrial production facility.

22. A non-transitory computer-readable memory medium on which is stored instructions for operating a TSN-enabled network coupling element, which is configured to receive redundant data packets, the instructions, when executed by a computer, causing the computer to perform the following steps:

ascertaining at least one number of expected, non-received redundant data packets by the TSN-enabled network coupling element, the ascertained number being at least one count of how many redundant data packets were expected by the TSN-enabled network coupling element but not received by the TSN-enabled network coupling element; and transmitting the ascertained number of expected, non-received redundant data packets from the TSN-enabled network coupling element to a control instance, the control instance being separate from the TSN-enabled network coupling element, wherein the redundant data packets have the same sequence number in a respective sequence number field of each of the redundant data packets.

23. A non-transitory computer-readable memory medium on which is stored instructions for operating a control instance for a TSN communication system, the instructions, when executed by a computer, causing the computer to perform the following step:

receiving, by the control instance, at least one ascertained number of expected, non-received redundant data packets from at least one TSN-enabled network coupling element, the ascertained number being at least one count of how many redundant data packets were expected by the TSN-enabled network coupling element but not received by the TSN-enabled network coupling element, the control instance being separate from the TSN-enabled network coupling element, wherein the redundant data packets have the same sequence number in a respective sequence number field of each of the redundant data packets.

* * * * *